United States Patent Office 3,709,947
Patented Jan. 9, 1973

3,709,947
6 - CHLOROPROPYLIDENE - 1,1a,6,10b - TETRAHYDROBENZO[a,e]CYCLOPROPA[c]CYCLOHEPTENES
John W. Cusic, Skokie, Ill., and William E. Coyne, St. Paul, Minn., assignors to G. D. Searle & Co., Chicago, Ill.
No Drawing. Filed July 26, 1971, Ser. No. 164,862
Int. Cl. C07c *25/18*
U.S. Cl. 260—649 R        3 Claims

ABSTRACT OF THE DISCLOSURE 1,1a,6,10b - tetrahydrodibenzo[a,e]cyclopropa[c]cycloheptenes having a chloropropylidene substituent at the 6-position are described herein. They are prepared by starting from the appropriate 1,1a,6,10b - tetrahydrodibenzo[a,e]cyclopropa[c]cyclohepten-6-one. They are useful as intermediates in the preparation of aminopropylidene compounds which are themselves useful as antidepressants, and as anti-bacterial, anti-protozoal, and anti-algal agents.

---

The present invention relates to chloropropylidene derivatives of 1,1a,6,10b - tetrahydrodibenzo[a,e]cyclopropa[c]cycloheptene. The structure and the numbering of the ring system involved is as follows

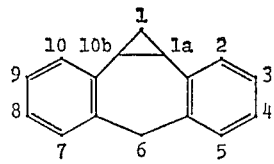

In particular, the present invention relates to compounds having the following general formula

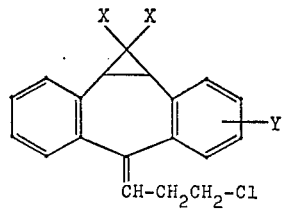

wherein X is selected from the group consisting of hydrogen and halogen; and Y is selected from the group consisting of hydrogen and halogen. The present invention also relates to cyclopropyl compounds used to prepare the above compounds. The halogen atoms referred to above include fluorine, chlorine, bromine, and iodine.

The compounds of the present invention are prepared by starting with the reaction of dichlorocarbene with a dibenzocycloheptenone of the formula

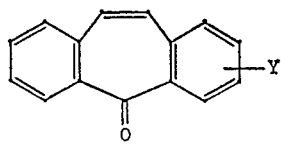

wherein Y is defined as above. The dichlorocarbene is preferably obtained by the reaction of sodium methoxide with ethyl trichloroacetate. The indicated reaction gives a 1,1 - dichloro - 1,1a,6,10b - tetrahydrodibenzo[a,e]cyclopropa[c]cyclohepten-6-one. Reduction of this ketone can be carried out either selectively to reduce only the carbonyl group or it can be carried out non-selectively to reduce the ketone to the alcohol and reduce off the chlorine substituents at the same time. In the first instance, a hydride reducing agent such as sodium borohydride can be used while in the latter instance, the reducing agent is lithium and t-butyl alcohol. Where selective reduction is used, the resulting dichloro alcohol can be further reacted with lithium and t-butyl alcohol to reduce off the 2 halogen atoms. Actually, this two step procedure is the preferred method for obtaining the tetracyclic alcohol without the chlorine atoms substituted at the 1-position. The tetracyclic alcohol can then be oxidized with an agent such as chromium trioxide to give the corresponding tetracyclic ketone.

The tetracyclic ketones can then be reacted with cyclopropylmagnesium bromide to give the corresponding 6-cyclopropyl alcohol. Rearrangement of the cyclopropyl alcohol with hydrochloric acid then gives the appropriate 6 - (3 - chloropropylidene) - 1,1a,6,10b - tetrahydrodibenzo[a,e]cyclopropa[c]cycloheptene. This chloropropylidene compound can be reacted with a variety of amines to give the corresponding aminopropylidene compound.

Saturated compounds can then be prepared by reduction of the aminopropylidene compounds. Thus, for example, reduction of 1,1 - dichloro - 6 - (3-dimethylaminopropylidene) - 1,1a,6,10b - tetrahydrodibenzo[a,e]cyclopropa[c]cycloheptene with lithium and t-butyl alcohol gives 6 - (3 - dimethylaminopropyl) - 1,1a,6,10b - tetrahydrodibenzo[a,e]cyclopropa[c]cycloheptene.

The aminopropylidene compounds prepared from the compounds of the present invention are useful because of their pharmacological properties. In particular, the compounds are anti-depressants and diuretics. The antidepressant activity is demonstrated in mice by a standard procedure. Thus, mice weighing 20–30 grams are first administered the test compound intragastrically in groups of 5 and then, 1 hour later, there is administered intraperitoneally 20 mg./kg. of 2-hydroxy - 2 - ethyl-3-isobutyl - 9,10 - dimethoxy - 1,2,3,4,6,7 - hexahydro-11bH-benzo[a]quinolizine, a synthetic compound with reserpine-like activity. The indicated dose of the reserpine-like compound produces essentially complete ptosis in the animals ½ hour after administration. A compound is rated active if it antagonizes this ptosis. 6-(3-dimethylaminopropyl) - 1,1a,6,10b - tetrahydrodibenzo[a,e]cyclopropa[c]cycloheptene (oxalate) was active in this test at a dose of 50 mg./kg. Similarly, 1,1 - dichloro-6-(3-dimethylaminopropylidene) - 1,1a,6,10b - tetrahydrodibenzo[a,e]cyclopropa[c]cycloheptene was active in this test at a dose of 25 mg./kg.

The aminopropylidene compounds also possess antibiotic activity against a variety of organisms. Thus, they inhibit the growth of bacteria such as *Diplococcus pneumoniae*, protoza such as *Tetrahymena gelleii*, and algae such as *Chlorella vulgaris*. The compounds can thus be combined with various known excipients and adjuvants in the form of dusts, solutions, suspensions, ointments, and sprays to provide compositions useful for disinfecting purposes. These compounds also inhibit germination of seeds of Trifolium.

The following examples are presented to further illustrate the present invention; they should not be construed as limiting it in spirit or in scope. In these examples, quantities are indicated in parts by weight unless parts by volume are specified, and temperatures are indicated in degrees centigrade (° C.). The relationship between parts by weight and parts by volume is the same as that existing between grams and milliliters.

EXAMPLE 1

To a stirred solution of 60 parts of 5H-dibenzo[a,d]cyclohepten-5-one in 880 parts of benzene and 200 parts by volume of hexane at 0–5° C. is added 60 parts of sodium methoxide followed by the portionwise addition of 200 parts of ethyl trichloroacetate over a period of 1 hour. The resulting suspension is stirred at 0–5° C. for 5 hours and then allowed to come to room temperature over a period of 18 hours. 200 parts of water is added and the benzene is separated, washed with water and dried over magnesium sulfate. Evaporation of the benzene solvent leaves a residual oil which is dissolved in 240 parts of hot ethanol, treated with charcoal, and filtered. Crystals form almost immediately in the filtrate and these are separated by filtration, washed with ethanol, and dried to give 1,1-dichloro - 1,1a,6,10b - tetrahydrodibenzo[a,e]cyclopropa-[c]cyclohepten-6-one melting at about 129–131° C. This compound has the following formula

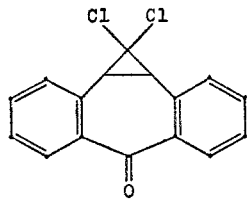

EXAMPLE 2

To a stirred suspension of 10.0 parts of 1,1-dichloro-1,1a,6,10b - tetrahydrodibenzo[a,e]cyclopropa[c]cyclohepten-6-one in 240 parts of methanol is added 3.0 parts of sodium borohydride. The mixture is stirred for 15 minutes at 25° C. and then refluxed for 2 hours before it is poured into 1000 parts of water containing 30 parts of concentrated hydrochloric acid. The solid precipitate which forms is separated by filtration, washed with water, and air dried to give 1,1 - dichloro-1,1a,6,10b-tetrahydrodibenzo[a,e]cyclopropa[c]cyclohepten - 6 - ol melting at about 164–168° C.

EXAMPLE 3

A solution of 30 parts of 1,1-dichloro-1,1a,6,10b-tetrahydrodibenzo[a,e]cyclopropa[c]cyclohepten - 6 - ol in 270 parts of tetrahydrofuran is prepared and stirred, 2.5 parts of lithium amide is added, and the resulting suspension is stirred for 30 minutes. 12 parts of lithium wire and 9 parts of t-butyl alcohol are added concomitantly over a period of about 1.5 hours. The reaction mixture is cooled from time to time to keep the mixture below reflux temperature. Once the addition is complete, the mixture is stirred for 1 hour and excess lithium is decomposed by the cautious addition of water. The mixture is then further diluted with water and extracted with ether. The combined ether extracts are washed with water and dried over magnesium sulfate. Evaporation of the ether solvent leaves a residual solid which is recrystallized from ethanol to give 1,1a,6,10b - tetrahydrodibenzo[a,e]cyclopropa[c]cyclohepten-6-ol melting at about 142–152° C.

EXAMPLE 4

To a stirred solution of 8.8 parts of 1,1a,6,10b-tetrahydrodibenzo[a,e]cyclopropa[c]cyclohepten-6-ol in 16 parts of acetone is added dropwise 14 parts by volume of Jones reagent (a solution of chromic acid and sulfuric acid in water). The resulting mixture is stirred for an additional 15 minutes and poured into water. It is then extracted with ether and the ether extracts are washed well with water and dried over magnesium sulfate. The solvent is evaporated to leave a crystalline residue. This is recrystallized from ethanol to give 1,1a,6,10b-tetrahydrodibenzo[a,e]cyclopropa[c]cyclohepten-6-one melting at about 79–82° C.

EXAMPLE 5

To a stirred solution of 64.5 parts of 2-chloro-5H-dibenzo[a,d]cyclohepten-6-one in 2650 parts of benzene at 5° C. is added 60 parts of sodium methoxide followed by the portionwise addition of 200 parts of ethyl trichloroacetate over a period of 1 hour. The reaction is stirred at 0–5° C. for 5 hours and then allowed to come to room temperature. 100 parts of water is added and the benzene layer is separated and washed with water. The solvent is evaporated to leave a residual mixture of crystals and oil. Ethanol is added to this residue and the insoluble material is separated by filtration. The ethanol solution is then cooled and the precipitate which forms is separated by filtration and recrystallized from ethanol to give 1,1,3-trichloro - 1,1a,6,10b - tetrahydrodibenzo[a,e]cyclopropa-[c]cyclohepten-6-one melting at about 103–110° C.

EXAMPLE 6

To 2.43 parts of magnesium in a dry flask is added 23 parts of tetrahydrofuran which has been distilled from lithium aluminum hydride and then, with stirring, a solution of 13.3 parts of cyclopropyl bromide in 23 parts of tetrahydrofuran is added portionwise. The reaction starts spontaneously and the addition is carried out at a rate to maintain reflux. When the addition is complete, the solution is refluxed for 2 hours and cooled slightly. Then, a solution of 18.9 parts of 1,1-dichloro-1,1a,6,10b-tetrahydrodibenzo[a,e]cyclopropa[c]cyclohepten-6-one in 180 parts of tetrahydrofuran is added portionwise. The mixture is then refluxed for 15 minutes and poured into excess water containing 20 parts of ammonium chloride. The resulting mixture is extracted with ether and the combined ether extracts are washed with water and dried over magnesium sulfate. Evaporation of the ether solvent leaves a yellow oil which is chromatographed on silica. Elution of the column with 30% hexane-benzene and evaporation of the solvent from the eluate leaves a solid which is recrystallized from ethanol to give 6 - cyclopropyl-1,1-dichloro - 1,1a,6,10b - tetrahydrodibenzo[a,e]cyclopropa[c] cyclohepten-6-ol melting at about 140–143° C. This compound has the following formula

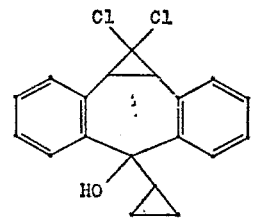

A solution of 14.3 parts of 6 - cyclopropyl - 1,1 - dichloro - 1,1a,6,10b - tetrahydrodibenzo[a,e]cyclopropa-[c]cyclohepten-6-ol in 210 parts of acetic acid containing 30 parts of concentrated hydrochloric acid is stirred at room temperature for 1 hour and then refluxed for 1.5 hours. The solvent is evaporated, toluene is added to the residue, and the toluene is removed under reduced pressure to leave a light yellow oil. This is triturated with a minimum amount of ethanol and the precipitate which forms is separated by filtration to give 6-(3-chloropropylidene) - 1,1 - dichloro-1,1a,6,10b-tetrahydrodibenzo[a,e] cyclopropa[c]cycloheptene melting at about 97.5–98.5° C.

EXAMPLE 7

Cyclopropylmagnesium bromide is prepared from 8 parts of cyclopropyl bromide and 1.4 parts of magnesium in 45 parts of tetrahydrofuran according to the procedure described in Example 6. To the resulting mixture is added a solution of 6.3 parts of 1,1a,6,10b-tetrahydrodibenzo-[a,e]cyclopropa[c]cyclohepten-6-one in 90 parts of tetrahydrofuran at a temperature just below reflux. When the addition is complete, the mixture is refluxed for 1 hour and then poured into excess water containing 7 parts of ammonium chloride. This mixture is extracted with ether and the ether extracts are combined and dried over magnesium sulfate. Evaporation of the ether solvent leaves a yellow oil which is chromatographed on a silica gel column. The column is eluted with benzene and evaporation of the benzene solvent from the eluate leaves a colorless oil which is 6 - cyclopropyl-1,1a,6,10b-tetrahydrodibenzo[a,e]cyclopropa[c]cyclohepten-6-ol.

A solution of 0.5 part of 6-cyclopropyl-1,1a,6,10b-tetrahydrodibenzo[a,e]cyclopropa[c]cyclohepten - 6 - ol in 5 parts of acetic acid containing 0.5 part of concentrated hydrochloric acid is stirred at room temperature for 1 hour and then refluxed for 1 hour. When the mixture is cooled, a crystalline precipitate forms. This is separated by filtration and recrystallized from ethanol to give 6-(3-chloropropylidene) - 1,1a,6,10b - tetrahydrodibenzo[a,e]cyclopropa[c]cycloheptene melting at about 148–149° C. This compound has the following formula

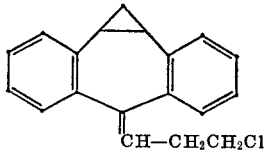

A solution of 2.7 parts of 6-(3-chloropropylidene)-1,1a,6,10b - tetrahydrodibenzo[a,e]cyclopropa[c]cycloheptene and 50 parts by volume of dimethylamine (liquid, cooled) in 27 parts of benzene is heated at 100° C. in a pressure reactor for 19 hours. The solvent is evaporated, and water is added to the residue which is then made alkaline with ammonium hydroxide. The resulting mixture is extracted with ether and the combined ether extracts are dried over potassium carbonate and the solvent is evaporated to leave a residual amber oil which is 6-(3-dimethylaminopropylidene) - 1,1a,6,10b - tetrahydrodibenzo[a,e]cyclopropa[c]cycloheptene. A solution of this oil in a minimum amount of ethanol is mixed with a saturated ethanol solution of oxalic acid. The precipitate which forms is separated by filtration to give 6 - (3-dimethylaminopropylidene)-1,1a,6,10b - tetrahydrodibenzo[a,e]cyclopropa[c]cycloheptene oxalate melting at about 195–197° C. The free base of this compound has the following formula

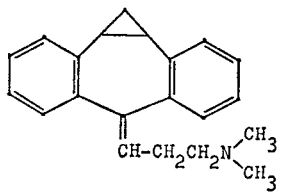

EXAMPLE 9

The procedure described in Example 8 is repeated using 1.5 parts of 6-(3-chloropropylidene)-1,1a,6,10b-tetrahydrodibenzo[a,e]cyclopropa[c]cycloheptene, 50 parts by volume of methylamine (liquid, cooled), and 27 parts of benzene. The procedure first gives 6-(3-methylaminopropylidene) - 1,1a,6,10b - tetrahydrodibenzo[a,e]cyclopropa[c]cycloheptene and this is converted to the oxalate salt which melts at about 203–205° C.

In a similar manner, 6-(3-chloropropylidene)-1,1a,6,10b - tetrahydrodibenzo[a,e]cyclopropa[c]cycloheptene is reacted with ethylamine and diethylamine to give, respectively, 6-(3-ethylaminopropylidene)-1,1a,6,10b-tetrahydrodibenzo[a,e]cyclopropa[c]cycloheptene and 6-(3-diethylaminopropylidene)-1,1a,6,10b - tetrahydrodibenzo[a,e]cyclopropa[c]cycloheptene.

EXAMPLE 10

A solution of 3.1 parts of 6-(3-chloropropylidene)-1,1-dichloro - 1,1a,6,10b - tetrahydrodibenzo[a,e]cyclopropa[c]cycloheptene and 50 parts by volume of methylamine (liquid, cooled) in 45 parts of benzene is heated for 18 hours at 95° C. in a pressure reactor. The resulting solution is then cooled and washed with water, and the resulting benzene solution is dried over potassium carbonate. Evaporation of the solvent leaves a residual oil which is 1,1-dichloro-6-(3-methylaminopropylidene) - 1,1a,6,10b- tetrahydrodibenzo[a,e]cyclopropa[c]cycloheptene. The oil is dissolved in ethanol and mixed with a saturated ethanol solution of oxalic acid. The precipitate which forms is separated by filtration and recrystallized from ethanol to give 1,1-dichloro-6-(3-methylaminopropylidene) - 1,1a,6,10b - tetrahydrodibenzo[a,e]cyclopropa[c] cycloheptene oxalate melting at about 209–215° C. The free base of this compound has the following formula

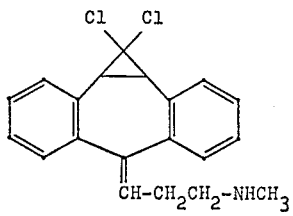

EXAMPLE 11

A solution of 3.0 parts of 6-(3-chloropropylidene)-1,1-dichloro - 1,1a,6,10b - tetrahydrodibenzo[a,e]cyclopropa[c]cycloheptene and 20 parts by volume of piperidine is refluxed for 18 hours. The resulting mixture is cooled and poured into water. The aqueous mixture is extracted with ether and the combined ether extracts are dried over potassium carbonate. Evaporation of the solvent leaves an amber oil which is dissolved in ethanol and mixed with a saturated ethanol solution of oxalic acid. The precipitate which forms is separated by filtration and recrystallized from ethanol to give 1,1-dichloro-6-(3-piperidinopropylidene) - 1,1a,6,10b - tetrahydrodibenzo[a,e]cyclopropa[c] cycloheptene melting at about 193–195° C.

EXAMPLE 12

A mixture of 3.5 parts of 6-(3-chloropropylidene)-1,1-dichloro - 1,1a,6,10b - tetrahydrodibenzo[a,e,]cyclopropa[c]cycloheptene and 3 parts of isonipecotamide is heated at 140° C. under nitrogen for 18 hours. A solid forms on cooling. This is washed with water and then dissolved in ethanol. The ethanol solution is filtered to remove some insoluble material and the solvent is evaporated to leave a residual amber oil which crystallizes on standing. This solid is redissolved in ethanol and treated with an excess of hydrogen chloride in 2-propanol to give 6-[3-(4-carbamoylpiperidino)propylidene]-1,1-dichloro - 1,1a,6,10b-tetrahydrodibenzo[a,e]cyclopropa[c]cycloheptene hydrochloride melting at about 242–247° C. after recrystallization from ethanol.

EXAMPLE 13

A solution of 3.5 parts of 6-(3-chloropropylidene)-1,1-dichloro - 1,1a,6,10b - tetrahydrodibenzo[a,e]cyclopropa[c]cycloheptene in 20 parts by volume of 1-methylpiperazine is heated at 90–100° C. for 18 hours. The resulting mixture is triturated with water and then extracted with ether. The combined ether extracts are washed with water and dried over potassium carbonate. Evaporation of the ether solvent leaves an amber oil which is 1,1-dichloro-6-[3-(4 - methyl-1-piperazinyl)propylidene]-1,1a,6,10b - tetrahydrodibenzo[a,e]cyclopropa[c]cycloheptene. The oil is dissolved in ethanol and mixed with an excess of hydrogen chloride in 2-propanol. The precipitate which forms is separated by filtration and recrystallized from ethanol to give 1,1-dichloro-6-[3-(4-methyl-1-piperazinyl)propylidene] - 1,1a,6,10b - tetrahydrodibenzo[a,e] cyclopropa[c]cycloheptene dihydrochloride melting at about 215–225° C.

EXAMPLE 14

3.0 parts of 6-(3-chloropropylidene)-1,1-dichloro-1,1a,6,10b - tetrahydrodibenzo[a,e]cyclopropa[c]cycloheptene and 2.6 parts of 1-(2-hydroxyethyl)piperazine is heated at 100–110° C. for 18 hours. Cooling of this mixture gives an oil which is triturated with water and extracted with ether. The combined ether extracts are washed with water and dried over potassium carbonate, and the solvent is evaporated to leave a residual oil which is 1,1-dichloro-6-{3-[4-(2-hydroxyethyl) - 1 - piperazinyl]propylidene}-1,1a,6,10b - tetrahydrodibenzo[a,e]cyclopropa[c]cycloheptene. This oil is dissolved in a minimum amount of ethanol and mixed with an excess of hydrogen chloride in 2-propanol. The precipitate which forms is separated by filtration and recrystallized from ethanol to give 1,1-dichloro-6-{3-[4-(2-hydroxethyl) - 1 - piperazinyl]propylidene}-1,1a,6,10b - tetrahydrodibenzo[a,e]cyclopropa[c]cycloheptene dihydrochloride melting at about 226–228° C.

What is claimed is:
1. A compound of the formula

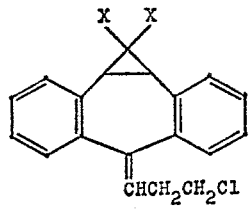

wherein X is selected from the group consisting of hydrogen and chlorine.

2. A compound according to claim 1 which is 6-(3-chloropropylidene)-1,1-dichloro-1,1a,6,10b - tetrahydrodibenzo[a,e]cyclopropa[c]cycloheptene.

3. A compound according to claim 1 which is 6-(3-chloropropylidene) - 1,1a,6,10b - tetrahydrodibenzo[a,e]cyclopropa[c]cycloheptene.

References Cited

UNITED STATES PATENTS 3,574,199   4/1971   Coyne et al. _____ 260—649

HOWARD T. MARS, Primary Examiner

U.S. Cl. X.R.

71—67, 106, 121; 260—240 R, 268 PC, 293 A, 570.8 TC, 591; 424—330